Figure 1:
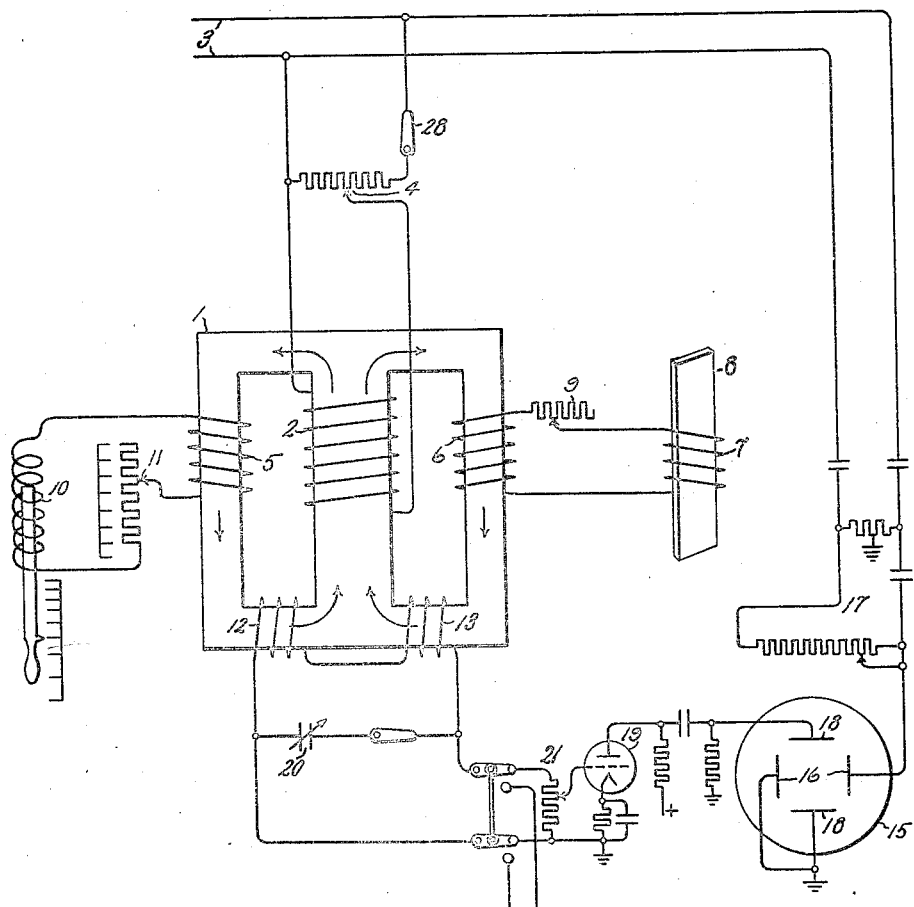

May 4, 1948.   C. M. SUMMERS   2,440,984
MAGNETIC TESTING APPARATUS AND METHOD
Filed June 18, 1945   2 Sheets-Sheet 1

Inventor:
Claude M. Summers,
by  Browell S. Mack
His Attorney

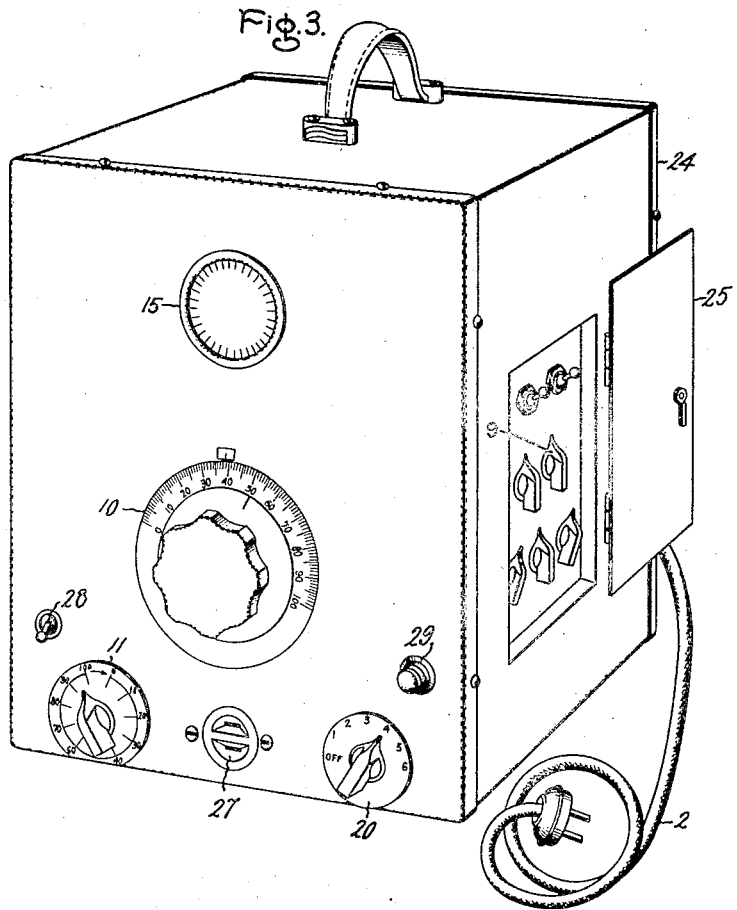
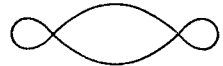
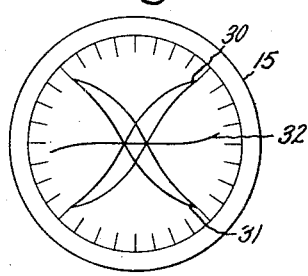

Patented May 4, 1948

2,440,984

UNITED STATES PATENT OFFICE 2,440,984

MAGNETIC TESTING APPARATUS AND METHOD

Claude M. Summers, Fort Wayne, Ind., assignor to General Electric Company, a corporation of New York Application June 18, 1945, Serial No. 600,008

7 Claims. (Cl. 175—183)

My invention relates primarily to apparatus for testing materials, such as metals used in industry, as to their classification, properties, composition, tempering, stress, temperature, etc. The invention may also be used to test coils and electromagnets, and as a magnetic field detector.

In carrying my invention into effect, I employ a balancing method of comparison or measurement and employ what may be termed a balancing transformer or magnetic bridge having three legs, with an alternating current exciting coil on a middle leg of the transformer, a testing circuit coil and a balancing circuit coil on opposite outer legs of the transformer, and a pair of detector coils connected in series opposition also on opposite outer legs of the transformer. By this arrangement all circuits involved are associated with the transformer and are excited through a single exciting winding such that expected variations in the excitation have a minimum influence on the testing results. The testing circuit coil is connected in a circuit coupled with the material or other apparatus being investigated. In general the properties of a material or apparatus, such as permeability, losses, etc., are reflected in the circuit of the test coil as resistance and reactance, and in accordance with my invention the balancing coil circuit contains adjustable impedance, preferably a reactance and resistance by means of which the properties of the material linked with the test coil may be balanced or compared. The two detector coils are used with a suitable indicator to indicate any difference in unbalance that may exist between the currents flowing in the testing and balancing coil circuits.

It will be observed that by reason of employing reactance and resistance in the balancing circuit both of which are independently adjustable, I am able not only to balance the load of the test circuit but also what may be generally considered as the power factor. That is, I can adjust the in-phase and quadrature components of the currents flowing in the balancing circuit. Thus variation in magnetic properties of the materials linked with the test circuit will call primarily for a variation in reactance in the balancing circuit to effect a balance, whereas a variation due to resistivity will call primarily for a readjustment of the resistance in the balancing circuit. Thus I am not only able to determine if two materials differ but also to determine, in a large measure, in what respects they differ.

Figure 2:
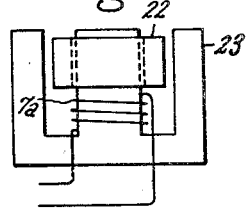

The features of my invention which are believed to be novel and patentable will be pointed out in the claims appended hereto. For a better understanding of my invention, reference is made in the following description to the accompanying drawing in which Fig. 1 represents a wiring diagram of a preferred embodiment of my invention; Fig. 2 a coil tester that may be used in the test coil circuit; Fig. 3 illustrates the appearance of portable test equipment embodying my invention; and Figs. 4–11 inclusive are representative oscilloscope figures obtained under conditions to be explained.

Referring now to Fig. 1, 1 represents a three-legged magnetic core having a central leg on which is wound an exciting coil 2 energized from a suitable source of alternating current voltage 3 with means, such as a potentiometer 4, for adjusting the value of the excitation as conditions require.

The outer legs of the core 1 are symmetrical and join the central leg on opposite sides of exciting or primary coil 2, so that the alternating flux of the central leg tends to divide equally and return through the outer legs as indicated by the arrows for a given half cycle. The outer legs are provided with a pair of similar coils 5 and 6, coil 6 being a test circuit coil shown in series with a test coil 7 which is shown linked with a sample of material 8 to be investigated. For certain tests more or less of a variable resistance 9 may be included in this test circuit. Coil 5 is a balancing coil which has included in series in its circuit a variable reactance 10 and a variable resistance 11. Also wound on the outer legs of core 1 are a pair of similar detector coils 12 and 13 which are connected in series opposition to a detector circuit. The transformer device may be considered as two identical magnetic circuits similarly excited.

For initial adjustment and rough work the detector may consist of a sensitive A.-C. voltmeter 14. However, for most purposes I employ a cathode ray oscilloscope 15 the sweep plates 16 of which are energized from the source 3 through a phase shifter at 17 and the deflection plates 18 of which are energized from the detector coils 12 and 13 after amplification as needed by an amplifier shown at 19. A variable condenser 20 may be connected across the detector coils to eliminate unwanted harmonics under certain conditions. With this connection of the cathode ray tube it will be evident that Lissajous figures may be produced where there is any unbalanced voltage in the detector circuit from the magnetic bridge. The cathode heating and other excitation circuits of the tube 15 are not shown since they may conform to usual practice.

When a sample of steel 8 is inserted in the test coil 7, a balance can be established by adjusting the series circuit of inductance 10 and resistance 11 until the image on the cathode ray screen is substantially a horizontal or straight image, indicating that a balance has been obtained and that the fundamental frequency output voltage of the detector circuit is zero. In the balancing circuit, the inductance is related to the permeability of the steel and the resistance represents the sum of all of the losses. Thus, the sample is balanced by its equivalent series circuit.

If a number of samples of the same steel are successively placed in the test coil the image may vary somewhat, especially if the sensitivity control indicated at 21 is turned fairly high. If the circuit is carefully balanced for each sample, a series of values of resistance and inductance can be obtained, which represent the variation in permeability and losses of the material.

When another sample of a different steel is inserted in the test coil, the image on the cathode ray screen changes radically. If a third sample is inserted in the test coil, a third image, characteristic of that steel, will be observed. As many as nine different steels have thus been separated by their characteristic images from a single setting of 10 and 11. If each steel is balanced individually, then a series of numbers will be obtained of inductance and resistance for each steel which represents the series equivalent circuit of that material.

Bar or rod steels in the stock room can be tested by pulling the stock out of the rack about two feet, slipping the test coil over the steel, and balancing the circuit. Then all of the remaining steel can be compared to the first sample.

Sheet steel or plates can be treated in a similar manner by using a large flat coil laid on the surface of the material.

Some steels are very sensitive to stresses. If a type of silicon steel, for example, is placed in the test coil and the circuit balanced, any slight bend or twist imposed on the steel causes the image on the oscilloscope to deflect nearly off the screen. Then from the changes in inductance and resistance necessary to rebalance the circuit, some knowledge is obtained of the changes in permeability and losses due to the stress.

The effect of temperature on the magnetic properties can be studied. For example, when a thin piece of Permalloy is inserted in the test coil and heated with a match, the cathode ray image changes appreciably. The change in the image may be caused by a stress gradient as well as by changes in magnetic properties.

When certain grades of steel are inserted in the test coil, the circuit becomes very sensitive to D.-C. magnetic fields. Rotating the sample in the earth's magnetic field causes a change in the Lissajous figure. Usually the image at balance contains a third harmonic of the supply frequency. In the presence of a weak magnetic field, a pronounced second harmonic appears and in strong fields the unbalance voltage is due to strong fundamental.

The basic circuit of this metal comparator has been extended to non-ferrous metals and stainless steels by making the supply frequency adjustable from 60 to 3,000 cycles. With a frequency above 1,000 cycles non-magnetic supercharger buckets have been separated; welds in copper wire have been located; flaws in tubing found; and differences in copper wire have been observed.

It is of course possible to substitute for the balancing circuit 10-11 a second test coil similar to 7 and compare two different samples directly. However, the equivalent balancing circuit containing the adjustable elements 10 and 11 is much to be preferred because then the nature of the difference between samples placed in coil 7 is obtained in terms of the values of reactance at 10 and resistance at 11. These adjustable devices are preferably provided with scales as indicated so that samples, such as 8, can be classified accordingly. In some cases an adjustable capacitance may be preferable to the variable inductance 10.

The adjustable resistance at 9 is used to compensate for changes in resistance of different test coils that are used at 7 for different sizes and shapes of samples, such as 8, used therein.

Oftentimes a perfect balance cannot be obtained due to harmonics of the fundamental voltage appearing in the detector circuit. Where such harmonics are bothersome they can be eliminated by connecting the capacitance 20 across the detector circuit and adjusting until the bothersome harmonic is filtered out. The capacitor 20 also has some tuning action in conjunction with the detector coils 12 and 13 at the fundamental frequency. Thus, by adjusting 20, an optimum condition can be obtained where the sensitivity to the fundamental unbalance voltage is increased and at the same time the 3rd harmonic is materially reduced. In other tests the harmonics may be used as an indication of the phenomenon under investigation. This is true for instance when the apparatus is used as a unidirectional fluxmeter. The phase shifter at 17 is useful in obtaining the greatest clarity of certain Lissajous figures. For example, a figure such as shown in Fig. 4 containing both fundamental and 3rd harmonic components may be changed to that of Fig. 5 by adjustment of the phase shifter to change the phase of the sweep voltage by thirty degrees. In place of coil 7, I may substitute completely assembled apparatus, such as reactors, transformers, an air core reactor, a motor, etc., to make certain types of measurements or comparisons. For example, suppose we desire to match pairs of instrument transformers for certain measuring systems. Instrument transformers, although built from the same specifications, may vary somewhat in resistance or reactance. By connecting such transformers in the place of test coil 7, then open and closed circuit reactance and resistance losses may be carefully compared, and those having similar characteristics matched.

In Fig. 2, I have shown a test coil arrangement especially adapted for testing coils such as represented at 22. Here I have provided an E-shaped core 23 having a central leg on which the coil 22 to be tested may be placed. Coil 7a also wound on the central leg takes the place of coil 7, Fig. 1, and is connected to coil 6, Fig. 1. With this arrangement my test apparatus is very sensitive to short circuited turns in coil 22. Also, the equivalent capacitance and leakage resistance between layers of coil 18 may be measured qualitatively.

Without limiting the invention to any particular set of specifications but to give certain relations that have been successfully employed as above described, I may use 2650 turns on the exciting coil 2 and excite it at 50 volts of the frequency desired; for example, 60 cycles for magnetic material tests, up to 3,000 cycles for nonmagnetic material tests. Coils 5 and 6 may each have 1,020 turns and coils 12 and 13 may each have 8,800 turns. The reactance at 10 may be varied from 15 to 500 millihenrys and the resistance at 11 from zero to 100 ohms. A capacitance that can be varied from 0.02 to 0.25 microfarad may be used at 20.

The entire apparatus with the exception of coil 7 may be assembled in a portable carrying case 18 by 14 by 12 inches such as represented in Fig. 3 at 24. The main adjustments and oscilloscope screen appear on the front of the case, as indicated, using the reference characters used in Fig. 1; and other adjustments including adjustable control circuits for the cathode ray tube are accessible through a side door 25. A convenient length lead 26 is provided for the source of supply, and the test coil 7 or other apparatus to be tested is plugged into a socket at 27. Twenty-eight (28) represents a line switch and 29 a pilot lamp to indicate when power is on and off.

For testing samples of steel for hardness, I prefer to use a frequency of the order of 2,000 cycles, and for hardness tests a circular graduated scale about the periphery of the oscilloscope screen is desirable. In Fig. 6 oscilloscope images, designated 30, 31, and 32, are typical images obtained when testing three samples for hardness and correspond respectively to values of 75.5, 75, and 74.5 on the Rockwell 30N scale. In general, when three different materials are tested, one material can be selected so that when it is used as a reference and the circuit adjusted to give a horizontal image as 32 in Fig. 6, the other two materials will have the most pronounced separation such as images 30 and 31.

Figs. 8 to 11, inclusive, represent characteristic harmonic images obtained with a high permeability material in the test coil in the presence of a unidirectional field. Fig. 7 shows a third harmonic image characteristic when no external unidirectional field is present and when the sample contains no residual magnetism. Figs. 8 and 9 are images obtained when the test piece contains residual magnetism, or when a weak unidirectional field acts on the sample, Fig. 8 indicating a polarity in one direction and Fig. 9 a polarity in the opposite direction. For fields higher than that of Fig. 8 or 9 the second harmonic image of Fig. 10 appears and if the field is increased still more, the image changes through that of Fig. 11 to a fundamental ellipse.

The three images of Fig. 6 as a group and the five images of Figs. 7 to 11 as a group assume no change in the setting of the equivalent balancing circuit containing inductance 10 and resistance 11 for the group in question.

Assume we are testing coils for short circuited turns and with a good coil in test position, using the test coil arrangement of Fig. 2, we have adjusted the balancing circuit to obtain a balanced condition indicated by a straight line image on the oscilloscope. When the good coil is replaced by a similar coil except that it has a short circuited turn, the beam of the oscilloscope screen will change and can be rebalanced by adjusting the equivalent circuit 10 and 11.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Testing apparatus comprising a three-legged magnetic core, the three legs being joined at each end, an alternating current exciting coil on the middle leg, a test circuit coil on one outer leg adapted to be connected to a test coil associated with a material or an object to be tested, a balancing circuit coil on the other outer leg, variable impedance means in circuit with the balancing circuit coil, detector coils on the two outer legs connected in series opposition, and means responsive to any differential voltage induced in said detector coil current.

2. Testing apparatus comprising a symmetrical three-legged magnetic core, with the three legs joined at both ends, an alternating current exciting winding on the central leg, a test circuit coil on one outer leg adapted to be connected with a test coil coupled with a material or apparatus to be tested, a balancing coil on the other outer leg, an adjustable reactance and an adjustable resistance connected in series with the balancing coil, a detector coil on each outer leg, a detector circuit connecting said detector coils in series opposition, a variable condenser connected across the detector circuit, and indicating means responsive to any differential voltage of said detector circuit.

3. Testing apparatus comprising a symmetrical three-legged magnetic core, with its legs joined at both ends, an alternating current exciting winding on the central leg, a test circuit coil on one outer leg, a balancing circuit coil on the other outer leg, said balancing coil being connected in a circuit containing means for independently adjusting the in-phase and quadrature components of the current in such circuit, detector coils on the two outer legs connected in series opposition, a cathode ray oscilloscope having deflection and sweep plates, means for impressing a voltage proportional to the differential voltage of the detector circuit across one set of such plates, a common source of alternating current voltage for energizing said exciting winding and the other set of deflecting plates, and means for adjusting the phase relation of the voltage applied to the last-mentioned set of deflection plates relative to said source.

4. Testing apparatus comprising a symmetrical three-legged magnetic core, with its three legs closed at both ends, an exciting winding on the middle leg adapted to be excited by an alternating current voltage, a pair of similar coils on the outer legs of said core, one of such similar coils being a test circuit coil which is adapted to be connected in circuit with a test coil magnetically coupled with material or apparatus to be tested, a variable reactance and a variable resistance connected in series with the other of said similar coils, similar detector coils on the outer legs of said core connected in series opposition, and a cathode ray oscilloscope connected with said detector coils and the excitation voltage of said apparatus for producing an indication of the magnitude of any differential voltage induced in said detector coils and its phase relation with respect to the excitation voltage of the testing apparatus.

5. Testing apparatus comprising a pair of similar magnetic circuits, alternating current winding means for similarly exciting both of said magnetic circuits, a secondary coil on one magnetic circuit adapted to be connected in a test circuit, a secondary coil on the other magnetic circuit adapted to be connected in a balancing circuit, a detector circuit linking both magnetic circuits and in which a voltage corresponding to any difference in the fluxes of said magnetic circuits is induced, and indicating means responsive to such differential voltage.

6. Testing apparatus comprising a test circuit including a test coil for subjecting the material or article to be tested to an alternating flux, a balancing circuit containing means for separately adjusting the in-phase and quadrature components of the current therein, similar magnetic core transformer means through which both the test and balancing circuits are energized, a detector circuit so linking both of the magnetic core transformer means as to have induced therein a voltage corresponding to any difference in the currents in the test and balancing circuits, and means influenced by such voltage for indicating any such difference and for reflecting changes in such difference caused by the adjustment of the balancing circuit.

7. Testing apparatus comprising a pair of similar magnetic circuits, alternating current winding means for similarly exciting both of said magnetic circuits, similar secondary coils on the similar magnetic circuits, said secondary coils being adapted for connection in separate closed circuits for comparison purposes, a detector circuit linking both magnetic circuits and in which a voltage corresponding to any difference in the fluxes of the magnetic circuits is induced, and indicating means responsive to such differential voltage.

CLAUDE M. SUMMERS.

REFERENCES CITED

The following references are of record in the file of this patent:

UNITED STATES PATENTS

| Number | Name | Date |
|---|---|---|
| 1,925,904 | Mayne | Sept. 5, 1933 |
| 2,010,189 | Hallowell | Aug. 6, 1935 |
| 2,058,518 | Schuster | Oct. 27, 1936 |
| 2,162,009 | Goldsmith | June 13, 1939 |

Certificate of Correction

Patent No. 2,440,984.  May 4, 1948.

CLAUDE M. SUMMERS

It is hereby certified that errors appear in the printed specification of the above numbered patent requiring correction as follows: Column 4, line 62, for "reesnted" read *resented*; column 6, line 18, for "current" read *circuit*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*